United States Patent
Hiel et al.

(10) Patent No.: US 7,041,909 B2
(45) Date of Patent: May 9, 2006

(54) METHODS OF INSTALLING AND APPARATUSES TO INSTALL AN ALUMINUM CONDUCTOR COMPOSITE CORE REINFORCED CABLE

(75) Inventors: Clement Hiel, Rancho Palos Verdes, CA (US); George Korzeniowski, Woodland Hills, CA (US)

(73) Assignee: Compsite Technology Corporation, Irvine, CA (US)

( * ) Notice: Subject to any disclaimer, the term of this patent is extended or adjusted under 35 U.S.C. 154(b) by 0 days.

(21) Appl. No.: 10/690,839

(22) Filed: Oct. 22, 2003

(65) Prior Publication Data

US 2004/0132366 A1 Jul. 8, 2004

Related U.S. Application Data

(63) Continuation-in-part of application No. PCT/US03/12520, filed on Apr. 23, 2003.

(60) Provisional application No. 60/374,879, filed on Apr. 23, 2002.

(51) Int. Cl.
*H02G 3/06* (2006.01)
(52) U.S. Cl. .................................. 174/88 R
(58) Field of Classification Search .............. 174/88 R, 174/84 R, 84 C, 74 R; 439/877, 863
See application file for complete search history.

(56) References Cited

U.S. PATENT DOCUMENTS

| | | | | |
|---|---|---|---|---|
| 2,988,727 A | * | 6/1961 | Berndt | .................. 439/863 |
| 4,496,212 A | | 1/1985 | Harvey | |
| 4,627,490 A | * | 12/1986 | Moore | ..................... 166/65.1 |
| 5,821,459 A | | 10/1998 | Cheenne-Astorino | |
| 6,805,596 B1 | * | 10/2004 | Quesnel et al. | ............. 439/877 |
| 2004/0026112 A1 | * | 2/2004 | Goldsworthy et al. | .. 174/106 R |
| 2005/0061538 A1 | * | 3/2005 | Blucher | ................... 174/126.2 |

FOREIGN PATENT DOCUMENTS

| EP | 1124235 A2 | 8/2001 |
|---|---|---|
| EP | 1168374 A2 | 1/2002 |

OTHER PUBLICATIONS

Fargo Mfg. Company, "XL' Dead Ends and Splices", New Product Bulletin, Apr., 1997, Sect. 8, pp. 5, 9, 11, 46, 47, & 81.
International Search Report and written opinion corresponding to related PCT application (PCT/US04/35199).

* cited by examiner

*Primary Examiner*—Chau N. Nguyen
(74) *Attorney, Agent, or Firm*—The McIntosh Group

(57) ABSTRACT

This invention relates to splice and dead end fittings and methods for splicing together two aluminum conductor composite core reinforced cable (ACCC) or terminating one composite core reinforced cable. The compression fitting uses a compressible body inside a rigid enclosure to hold the composite cores. First, the composite cores can be stripped of the aluminum conductor to provide the best bond between the compressible body and the composite core, the load-bearing member of the cable. After inserting the composite core into the compressible body, a compression implement may be used to compress the compressible body. Without the ability to expand because the rigid enclosure forces the compressible body to maintain its shape, the compressible body places compressive forces on the composite core. The compressible body holds the composite core with frictional or mechanical forces.

40 Claims, 14 Drawing Sheets

METHODS OF INSTALLING AND APPARATUSES TO INSTALL AN ALUMINUM CONDUCTOR COMPOSITE CORE REINFORCED CABLE

CROSS REFERENCES TO RELATED APPLICATIONS

In relation to this Continuation in Part Application, applicants claim priority of earlier PCT filing PCT/US03/12520 filed in the International Receiving Office of the United States Patent and Trademark Office on 23 Apr. 2003, the entire disclosure of which is incorporated by reference herein, which claims priority from U.S. provisional application Ser. No. 60/374,879 filed in the United States Patent and Trademark Office on 23 Apr. 2002, the entire disclosure of which is incorporated by reference herein.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF THE INVENTION

1. Field of the Invention

The present invention relates to apparatuses and methods to splice and terminate a composite core reinforced cable. More particularly, the invention relates to several fittings capable of joining two composite core cables by the load bearing composite cores and to several fittings that can terminate or dead end the composite core cables.

2. Description of the Related Art

The blackouts in 2003 that affected the United States, Great Britain, and France have demonstrated an urgent need to update the world's power grids. An elegant and immediate solution is the replacement of existing conductors with composite core reinforced cables. An example of a composite core reinforced cable, the ACCC cable is described in PCT Application No. PCT/US03/12520, which is incorporated herein by reference. Hereinafter, the ACCC cable will be used to represent all composite core cables. These ACCC cables provide a greatly increased ampacity. In some situations, the ACCC cable may provide a 200% increase in ampacity. Replacing antiquated cables with ACCC cables is an obvious and effective method for increasing the capabilities of the world's electrical transmission and distribution systems. To replace the outdated cables, linemen will need to install the ACCC or other composite core cables onto existing structures.

Unfortunately, current methods and devices to install these cable do not exist. To install the ACCC cables, the linemen must be able to splice the cables and attach the cables to poles or structures using dead ends. Unfortunately, existing devices and methods will not be effective.

While cable lengths for a single strand of ACCC cable may cover several thousand feet, a power grid requires several hundred or thousand miles of cable. To span these distances, the linemen will splice or couple two smaller cable spans together. The splice functions as both a mechanical junction that holds the two ends of the cables together and an electrical junction allowing the electric current to flow over or through the splice.

In the traditional aluminum conductor steel reinforced cable (ACSR), the cable is formed from a set of twisted aluminum conductors wrapped around a core of steel wires. The aluminum conductor mostly functions as the electrical conductor, while the steel core mostly functions as the load-bearing member. The aluminum conductor does carry some of the load and the steel core does help conduct some of the electric current. To splice two ACSR cables, a device such as a full tension compression splice may be used. Hubbell/Fargo Manufacturing of Poughkeepsie, N.Y., offer these types of splices. For this device, a lineman strips the aluminum away from the steel core. A sleeve or die is placed over the end of the exposed core. The lineman leaves a small part of the steel core exposed beyond the end of the sleeve. A compression vise is used to affix the sleeve to the steel core. The sleeve and steel core from both cables are then inserted into a second tube. The tube is long enough to cover the sleeve and part of the aluminum conductor that was not stripped away. This tube is also crimped with a compression vise. A compression fitting is created that holds both the aluminum conductor and the steel core.

The method just described works well with ACSR cables, but is ineffective with ACCC cables. First, the aluminum conductor is not a load bearing member in the ACCC cable. Thus, crimping a tube to the aluminum conductor does not hold together the composite core load-bearing members of the two cables. In addition, the exceptional crimping force used, around 60 tons psi, could crush the composite core. Thus, the methods used for ACSR cables are flawed because the methods do not provide a gobd mechanical coupling between the load-bearing members of the ACCC cables.

In the composites industry, composite members are often adhered together. A special glue, epoxy, or adhesive is applied to the composite and the member being affixed to the composite. Unfortunately, several problems occur with these adhesive bonds. First, adhesives do not spread the forces applied to the bond across the entire area of the bond. Rather, forces tend to localize along one or two inches of the bond. With the incredible tensional forces on the cables (nearly 10,000 pounds), the adhesive bonds tend to fail in successive one inch regions until the entire bond is compromised. Also, bonding to a composite member tends to only apply forces to the outer fibers in the composite. Thus, as forces build, the fibers on the exterior of the composite fail, and then the bond fails also. To compensate, some composite manufacturers slice the composites lengthwise along an acute angle. Then, the two sliced composites are bonded along the slice. This bond distributes the forces along all the fibers not just those on the exterior of the composite. Unfortunately, the composite core of an ACCC cable is small. Making the slices in these cores would be extremely difficult. In addition, bonding the composites would require special tools, materials, and training beyond that a lineman currently enjoys.

To terminate a cable, a lineman normally installs a dead end. Similar devices and methods are used in the industry to install dead ends. Thus, the same problems mentioned above exist for dead ends also.

Thus, there exists a need for a cable splice for ACCC reinforced cables, and there exists a need for a cable dead end for ACCC reinforced cables.

BRIEF SUMMARY OF THE INVENTION

ACCC reinforced cables provide a utility or power supplier with superior properties. Increased ampacity can be achieved by using an ACCC cable. With the advantages provided by ACCC cables, utilities are turning to ACCC reinforced cables to update and improve outdated transmission and distribution cables. Unfortunately, methods and systems to install these cables have yet to be created. The present invention provides several fittings to splice two ACCC cables together and several fittings to terminate the ACCC cables. In addition, the present invention provides methods to splice and terminate the ACCC cables.

First, a compression fitting can use a compressible body inside a rigid enclosure to hold the composite cores. The composite cores can be stripped of the aluminum conductor to provide the best bond between the compressible body and the composite core, which is the load-bearing member of the cable. After inserting the composite core into the compressible body, a compression implement may be used to compress the compressible body. Without the ability to expand because the rigid enclosure forces the compressible body to maintain its shape, the compressible body places compressive forces on the composite core. These compressive forces create enormous friction between the compressible body and the composite core. This friction holds the composite core in the compressible body. The compression fitting can be covered by a conductor sleeve to transfer the electric current over the splice. This compression fitting enables a good mechanical and electric junction.

A mechanical fitting may also be used. A lineman can attach a conic-shaped sleeve or die to the composite core and insert that die into a funnel shaped enclosure. As cable tension pulls on the core and the attached die, the die is pulled further into the funnel. The funnel creates increased compressive forces on the die and the core as the die is pulled into the funnel. These compressive forces increase the splices ability to hold the cables together.

The dead ends apply the same type devices and methods. The dead ends and splices and other features of the invention are best understood by referring to the detailed description of the invention, read in light of the accompanying drawings

Figure 1:
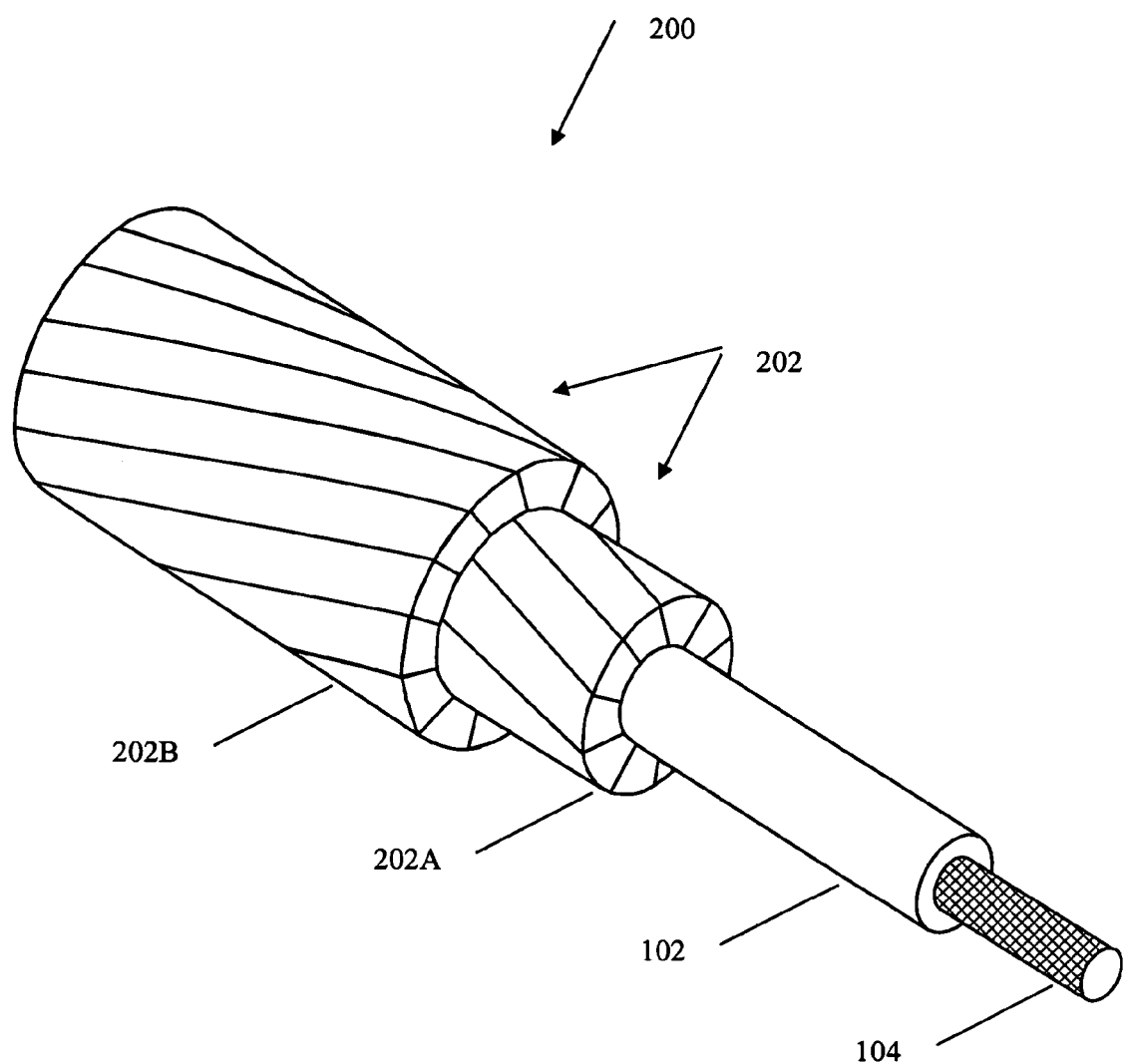
FIG. 1 is a cross-sectional view of one embodiment of a composite core reinforced cable.

To clarify, each drawing includes reference numerals. These reference numerals follow a common nomenclature. The reference numeral will have three digits. The first digit represents the drawing number where the reference numeral was first used. For example, a reference numeral used first in drawing one will have a number like 1XX while a number first used in drawing five will have a number like 5XX. The second two numbers represent a specific item within a drawing. One item in drawing 1 will be 101 while another item will be 102. Like reference numerals used in later drawing represent the same item. For example, reference numeral 102 in FIG. 3 is the same item as shown in FIG. 1.

DETAILED DESCRIPTION OF THE INVENTION

The present invention will now be described more fully hereinafter with reference to the accompanying drawings, in which exemplary embodiments of the invention are shown. This invention may, however, be embodied in many different forms and should not be construed as limited to the embodiments set forth herein; rather, these embodiments are provided so that the disclosure will fully convey the scope of the invention to those skilled in the art. The drawings are not necessarily drawn to scale but are configured to clearly illustrate the invention. The invention is as set forth in the claims.

The present invention relates to methods and apparatuses to splice together two composite core reinforced cables. FIG. 1 illustrates one embodiment of an ACCC reinforced cable 200. FIG. 1 illustrates an ACCC reinforced cable having a reinforced carbon fiber/epoxy resin composite inner core 104 and a reinforced glass fiber/epoxy resin composite outer core 102, surrounded by a first layer of aluminum conductor 202A, wherein a plurality of trapezoidal shaped aluminum strands wrap around the composite core 100 and having a second layer of aluminum conductor 202B wherein a plurality of trapezoidal shaped aluminum strands wrap around the first aluminum layer 202A. For this description, the splice and dead end fittings will be explained using this one embodiment of the composite core cable as an example. However, the splice and dead end fittings may be used with any of the embodiments of a composite core reinforced cable.

To determine how to make the splice or dead end, an understanding of the forces affecting the cable is needed. All explanations that follow apply to an ACCC cable that is equivalent to a Drake style ACSR cable. For this type of cable, the required tensional force a splice must maintain is 10,000 pounds. However, a 3 times safety factor is required. Thus, the splice should be able to maintain a tensional force of 30,000 pounds. In a frictional fitting explained below, a tensional force is created by making a frictional coupling between the splice and the composite core. To maintain a tensional force of 30,000 pounds a frictional force of 30,000 or more pounds must be applied to the composite core. A frictional force is a function of the area under contact, the compressive force of the contact, and the coefficient of friction. Frictional force is calculated according to the equation below:

Frictional Force=(Coefficient of Friction)×(Compressive Force)×(Area)

The area is the product of the length times the outside circumference of the composite core. For the purposes of this embodiment. The Coefficient of Friction will be assumed to be 1. As stated before, the frictional force should be equal to or greater than the tensional load on the cable. Thus, the frictional force should be at least 30,000 pounds. The area compressed may be changed depending on the compressive forces that can be applied. The composite core of the ACCC cable may be able to withstand a compressive force up to 10,000 pounds. For safety sake, a lesser compressive force of 3,000 pounds may be used. The circumference of a composite core, with a 0.371 outside diameter, is around 1.17 inches. The amount of frictional force may be adjusted by placing more or less of a length of the composite core under compression. In this example, the length under compression should be at least 6 inches. One skilled in the art will recognize how to apply these formulas to determine how to modify the dead ends and splices according to the present invention.

Cable Splice

The present invention relates to several fittings used to splice the ACCC reinforced cables 200. The main load bearing element of the ACCC cable 200 is the composite core 100. Therefore, it is advantageous to have a splice apparatus that can hold together the composite cores 100 of the ACCC cables 200. Beyond holding together the composite cores, the splice should provide an electrical junction between the two or more ACCC reinforced cables. The present invention accomplishes these objectives.

Compression Fittings

Figure 2A:
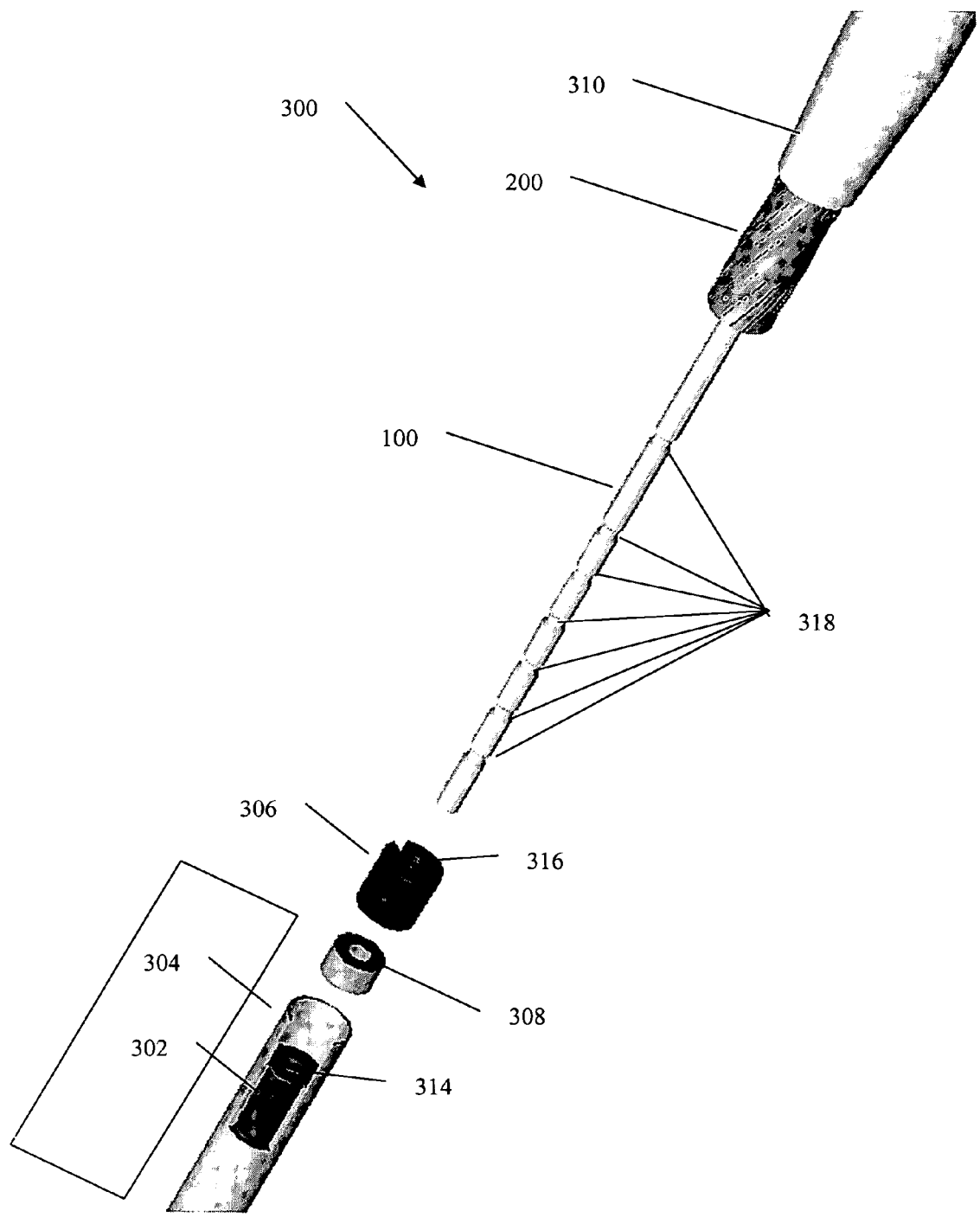
FIG. 2A is an exploded one-sided view of one embodiment of a compression splice fitting accordance with the present invention.
Figure 2B:
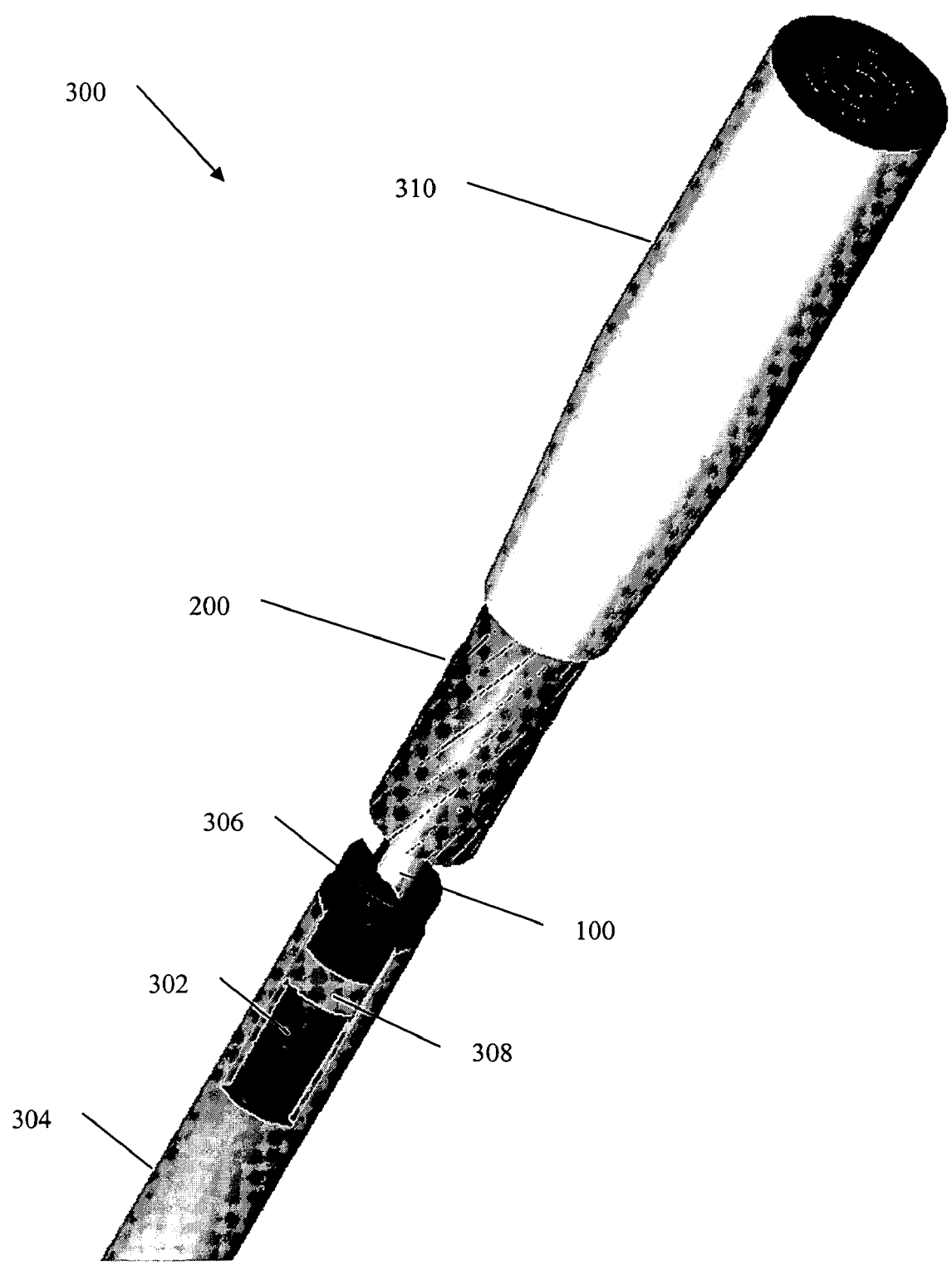
FIG. 2B is an isometric one-sided view, with a window through the rigid body, of one embodiment of a compression splice fitting in accordance with the present invention.
Figure 2C:
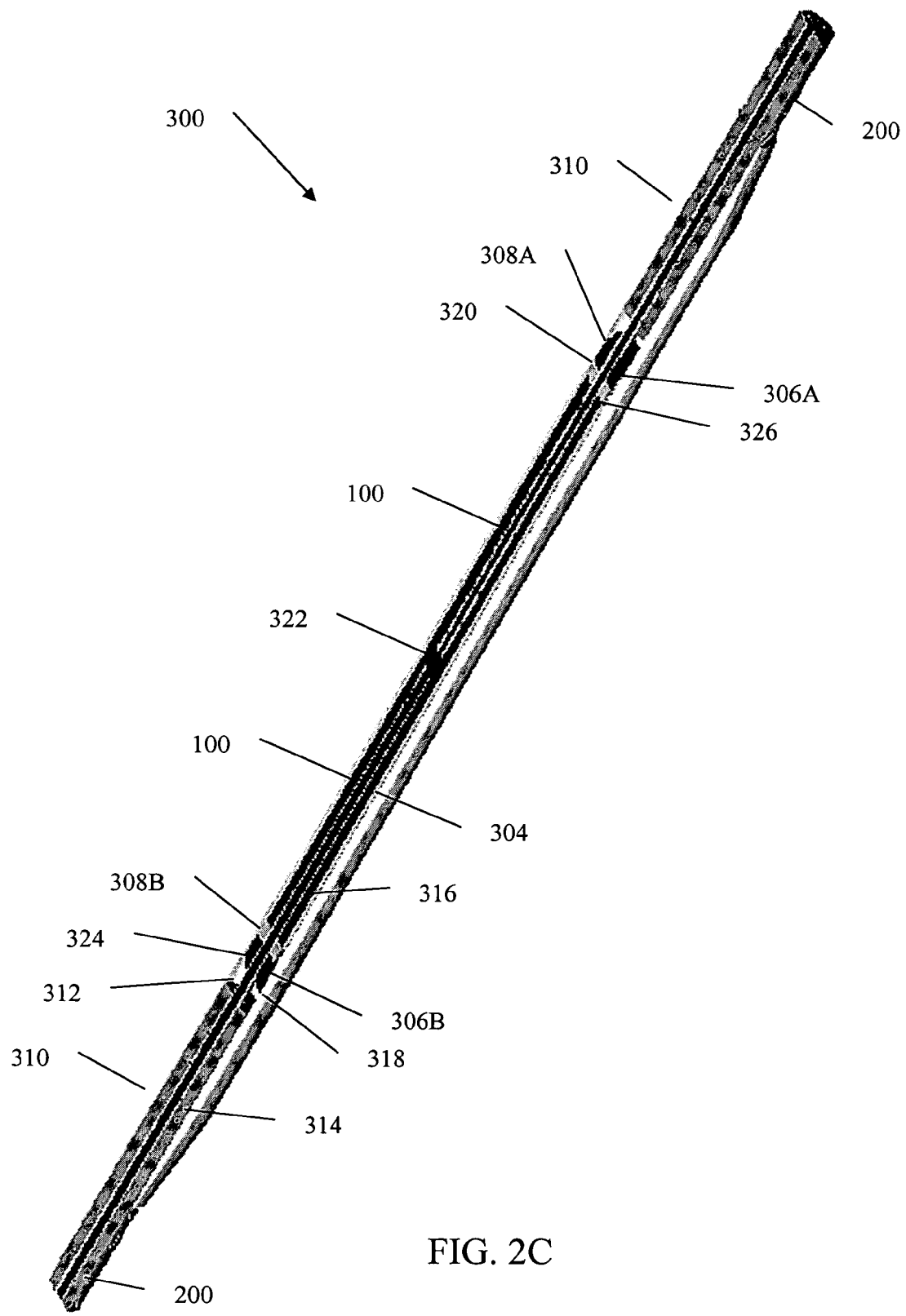
FIG. 2C is a cross-sectional view of one embodiment of a compression splice fitting in accordance with the present invention.

One embodiment of a splice is shown in FIGS. 2A, 2B and 2C. This embodiment is a compression fitting splice. In this embodiment, the compression fitting may include, but is not limited to, a compressible body 302, a rigid enclosure 304, and at least one compression implement 306. In further embodiments, the compression fitting may also include a washer 308 and a conductor sleeve 310. These elements of the compression fitting function to mate with the composite core 100 of the ACCC cable 200 and compress the compressible body 302 such that friction holds onto the composite core 100. Each element will be explained further below.

The compressible body 302 is a structure that can be compressed under great pressure. A compressible body 302 is any material that can be formed into an appropriate shape and be used to put compressive forces on the composite core 100. Examples of such materials may include, but are not limited to, malleable metals or polymers that can compress. One embodiment of the compressible body 302 would be an elastomer 302. The elastomer 302 may be a type such as CAMLAST from Cameron Elastomer Technology. Elastomers 302 can have the ability to withstand high temperatures when the cable 200 is in operation. Throughout the remainder of this description, the compressible body 302 may be referred to as the elastomer 302. However, this description is not meant to limit the invention to that one embodiment, but all types of compressible bodies 302 that can perform the required function of frictionally holding the composite core 100 are included in this invention.

The elastomer 302 may provide one or more cavities 314 to mate with the composite core 100. These cavities 314 provide the female end of the mate with the composite core 100. In one embodiment, the cavity 314 perfectly fits the composite core 100. In essence, the inside shape and size of the cavity 314 is the same as the outside shape and size of the composite core 100. FIG. 2A and FIG. 2B shows the elastomer 302, its corresponding cavity 314, and the composite core 100 having a generally circular cross section. However, the composite core 100, the elastomer 302, and the cavity 314 may take on other shapes for cross sections and other shapes for the interior cavities.

Figure 5:
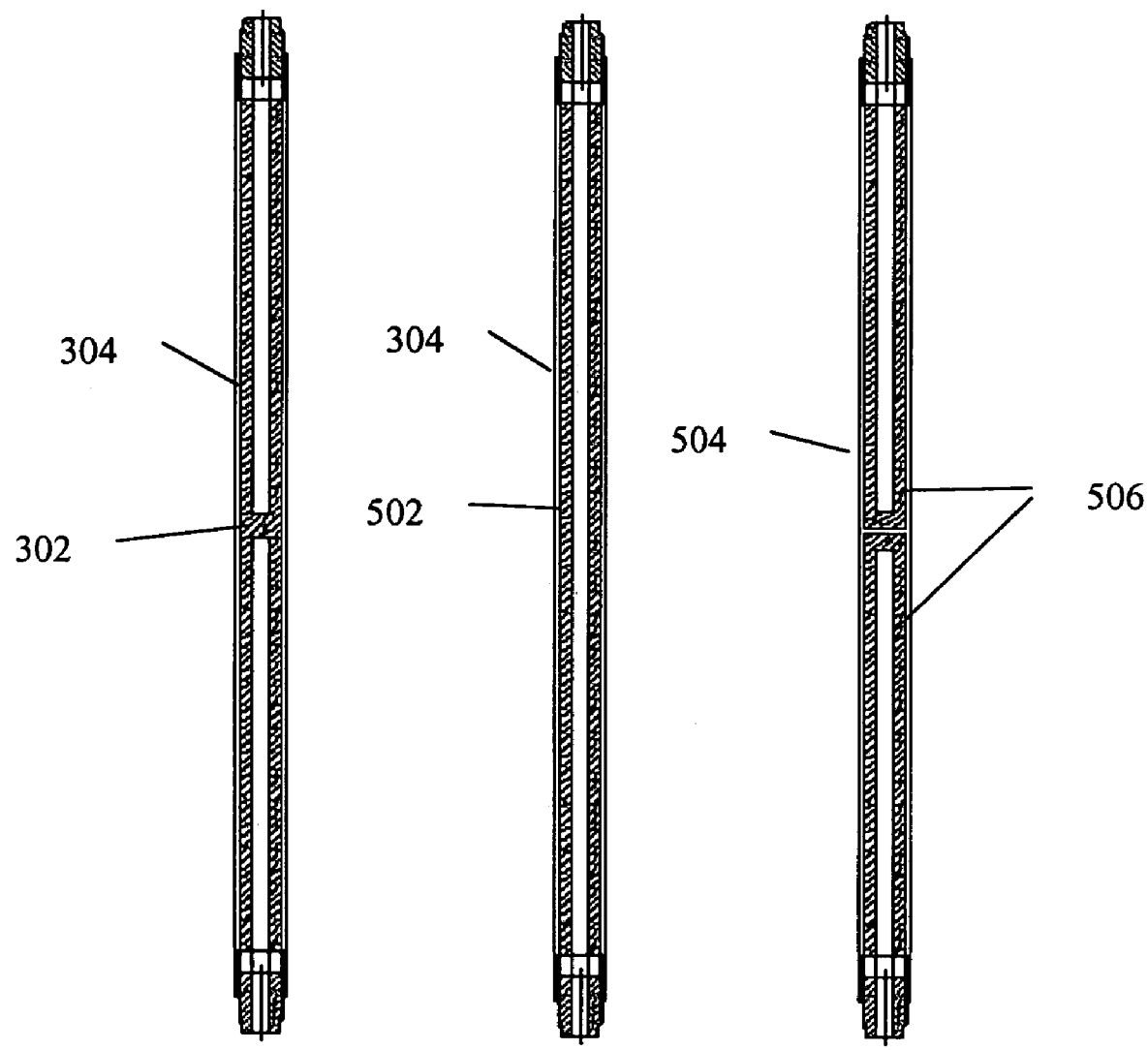
FIG. 5 shows several different embodiments of the rigid enclosure and the compressible body in accordance with the present invention.

In an exemplary embodiment shown in FIG. 2A, the cavities 314 extend within the elastomer 302 axially centered along the length of the elastomer 302. As shown in FIG. 2C, the elastomer 302 may have a first cavity 314 and a second cavity 314 in which each cavity 314 accepts the composite core 100 of either the first cable 200 or second cable 200. The cables 200 can be inserted in the cavities 314 at the first end 320 or second end 318. In the embodiment shown, there are two separate and distinct cavities 314, with a wall of elastomer 324 separating the two cavities 314 at about the midpoint 322 of the elastomer 302. Other embodiments of the elastomer 302 and rigid enclosure 304 are shown in FIG. 5. The cavity 314 may be formed as one cavity 502 spanning the entire length of the elastomer 302. Also, in some embodiments, the rigid enclosure 504 may form two cavities 314, and each cavity 314 would have a separate elastomer 506.

Another element of the compression fitting is the rigid enclosure 304. The rigid enclosure 304 provides a case that encapsulates the elastomer 302. The rigid enclosure 304 should have the same general shape as the elastomer 302 and allow the elastomer 302 to fit inside the rigid enclosure 304. In an exemplary embodiment, the rigid enclosure 304 is a splicing tube 304 as shown in FIG. 2A and FIG. 2B. However, the invention is not limited to that one embodiment but may assume any shape that can encapsulate the elastomer 302. The rigid enclosure 304 prevents the elastomer 302 from expanding or becoming misshapen when the elastomer 302 is compressed. Thus, the rigid enclosure 304 must maintain its shape when the elastomer 302 is being compressed and pressing on the interior walls of the enclosure 304.

The rigid enclosure 304 may be made of various rigid materials. The materials may include, but are not limited to, composites, graphite, hardened metals, or other sufficiently rigid and strong materials. In an exemplary embodiment, the rigid enclosure 304 is formed from steel.

In FIG. 2, the rigid enclosure 304 has the shape of a splicing tube 304. This shape is only exemplary. The rigid enclosure 304 should take on the shape of the elastomer 302. However, the rigid enclosure 304 may be hereinafter described as a splicing tube 304. The rigid enclosure 304 provides openings to allow the elastomer 302 to mate with the composite cores 100. The embodiment shown has a first open end 326 and a second open end 324. In addition, the rigid enclosure 304 also can provide additional openings for the compression implement 306.

Figure 6:
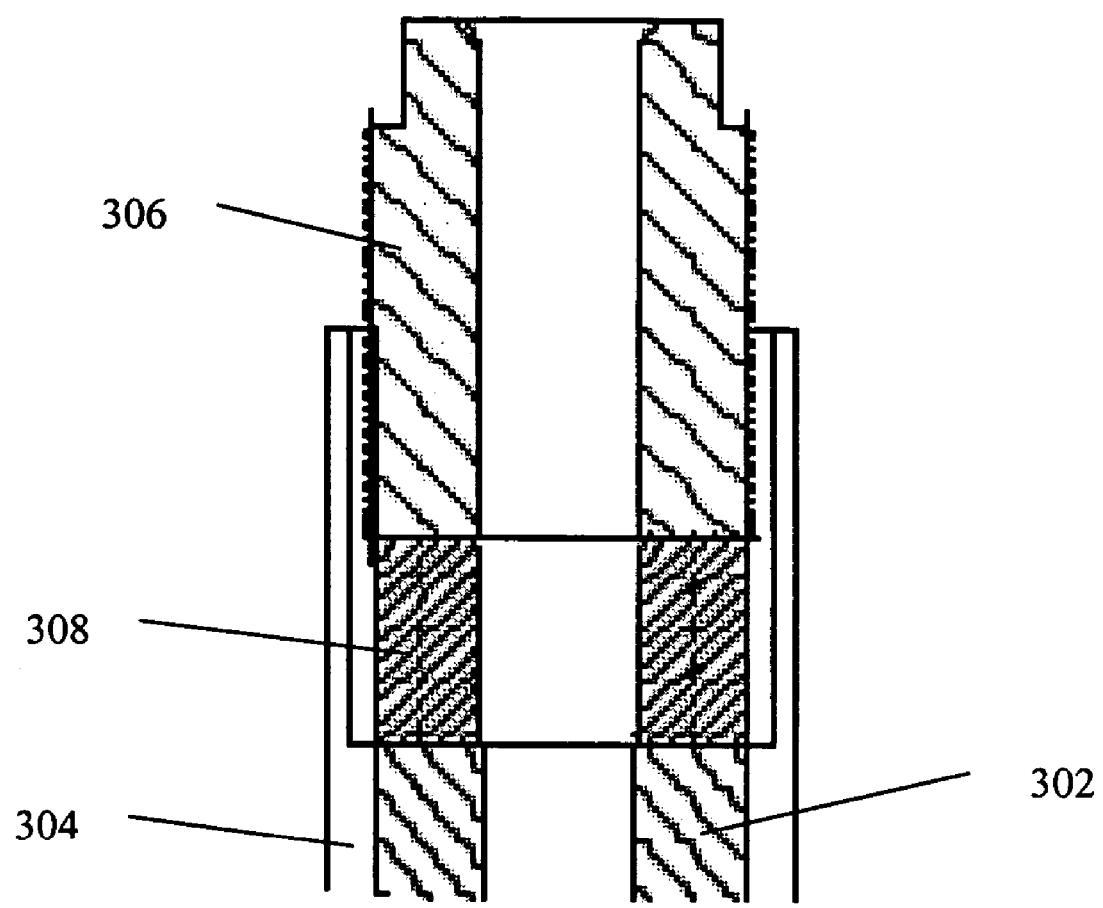
FIG. 6 shows one embodiment of the mating of the compression nut with the splicing tube in accordance with the present invention.

The compression implement 306 is the device or means of compressing the elastomer 302. Thus, the compression implement 306 is any mechanical, electrical, pneumatic, or other device that can compress the elastomer 302. In an exemplary embodiment, the compression implement 306 is a compression nut 306 that screws into threads on the inside of the rigid enclosure 304, see FIG. 6. However, in other embodiments the compression implement 306 may use other devices and openings to compress the elastomer 302. Hereinafter, the compression implement 306 will be described as a compression nut 306, but the invention is not meant to be limited to that one embodiment.

The compression nut 306 can have a hollow center 316. This hollow center 316 can allow the composite core 100 to pass through the compression nut 306 and into the elastomer 302. While this is only an exemplary embodiment, this arrangement of the compression nut 306, elastomer 302, composite core 100, and rigid enclosure 304 allows there to be only two openings 324 and 326 in the rigid enclosure 304. The compression nut 306 can have a series of threads along the outside surface of the nut 306. These threads can attach the nut 306 to the splicing tube 304, which has related threads along the inside surface of the tube 304. By tightening one or both of the compression nuts 306, a compressive force is applied to the elastomer 302. This compressive force causes a compressive and frictional area of contact between the elastomer 302 and the composite core 100. The frictional contact extends along the length of the composite core 100 that is inside the elastomer 302. It is the compressive and frictional forces that hold the composite core 100 in the elastomer 302.

Another possible component of the compression fitting 300 is a washer 308. The washer 308 can be placed in the opening of the splicing tube 304 before threading the compression nut 306 into the tube 304. The washer 308 provides a surface for the nut 306 to turn on that prevents the turning nut 306 from grabbing the elastomer 302 and causing the elastomer 302 to twist. This twisting or binding could damage the elastomer 302 or prevent the even and uniform compression of the elastomer 302. Thus, the washer 308 acts as a preventative measure against binding.

In another embodiment, the compression fitting 300 may also include a conductor sleeve 310. The conductor sleeve 310 refers to any structure that functions as an electrical jumper between the first cable 200 and the second cable 200. A conductor sleeve 310 conducts and passes the electric current from one cable 200 to another. In one embodiment, the conductor sleeve 310 may be a cable 200 that is crimped to the conductors 202 of the first cable 200 and second cable 200. In an exemplary embodiment, the conductor sleeve 310 is another hollow cylinder that can be slipped over the entire splice and contact the conductors 202 on both the first cable 200 and second cable 200. The conductor sleeve 310 may be an electrically conductive tube that can carry the electric current from the first cable 200, over the splice, to the second cable 200. This embodiment of the conductor sleeve 310 is shown in FIG. 2C and is only exemplary.

The conductor sleeve 310 may have various cross-sectional areas. In one embodiment, the cross-sectional area of the conductor sleeve 310 exceeds the cross-sectional area of the conductors 202 on the cables. For instance, the cross-sectional area of the conductor sleeve 310 may be twice the cross-sectional area of the cable conductors 202. By increasing the cross-sectional area in the conductor sleeve 310, the operating temperature of the conductor sleeve 310 can be kept lower than the cable conductors 202. This lower temperature protects the elastomer 302 and other compression fitting parts from damage due to high operating temperatures.

Mechanical Splices

Figure 7:
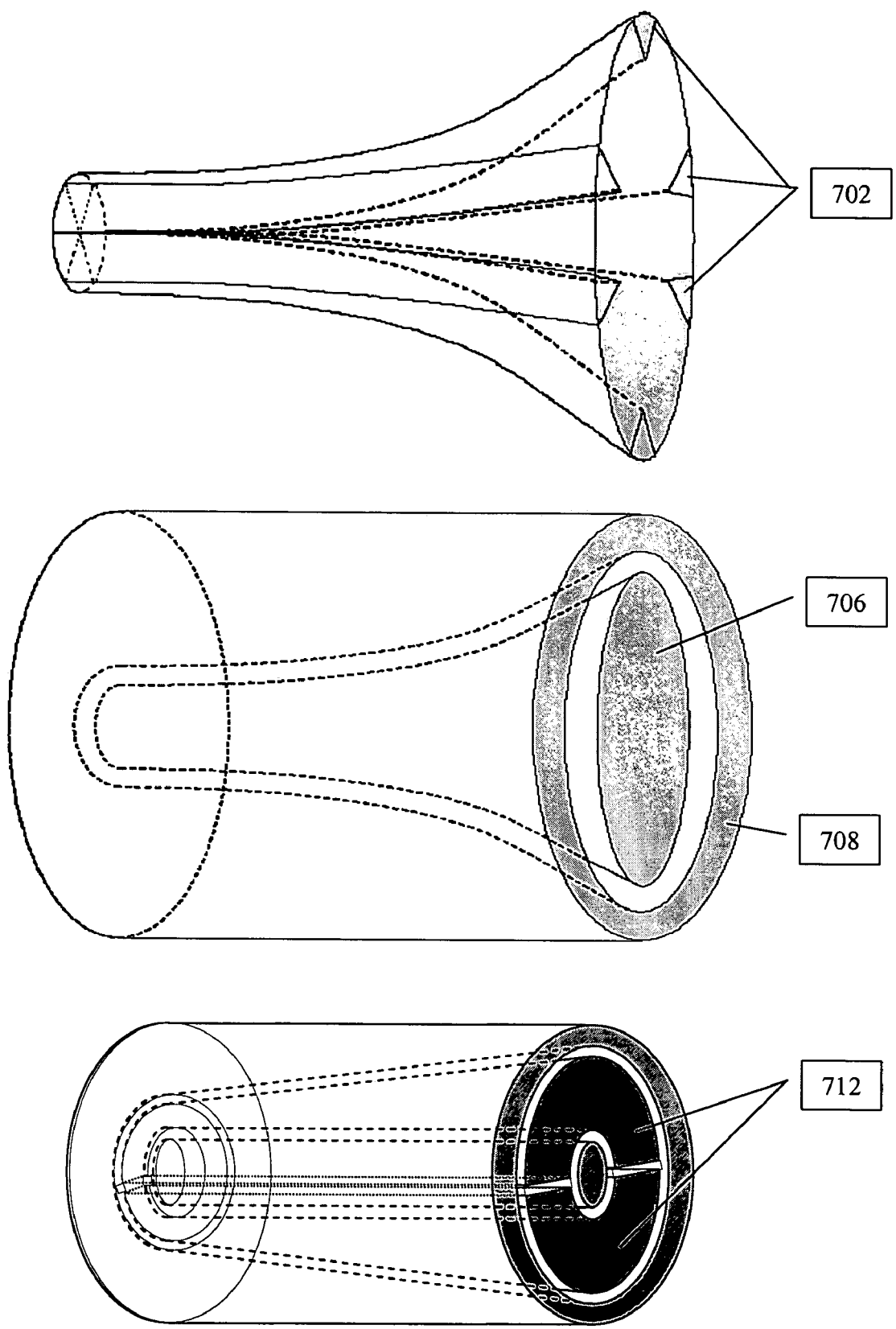
FIG. 7 shows several embodiments of core and splice attachments in accordance with the present invention.
Figure 11:
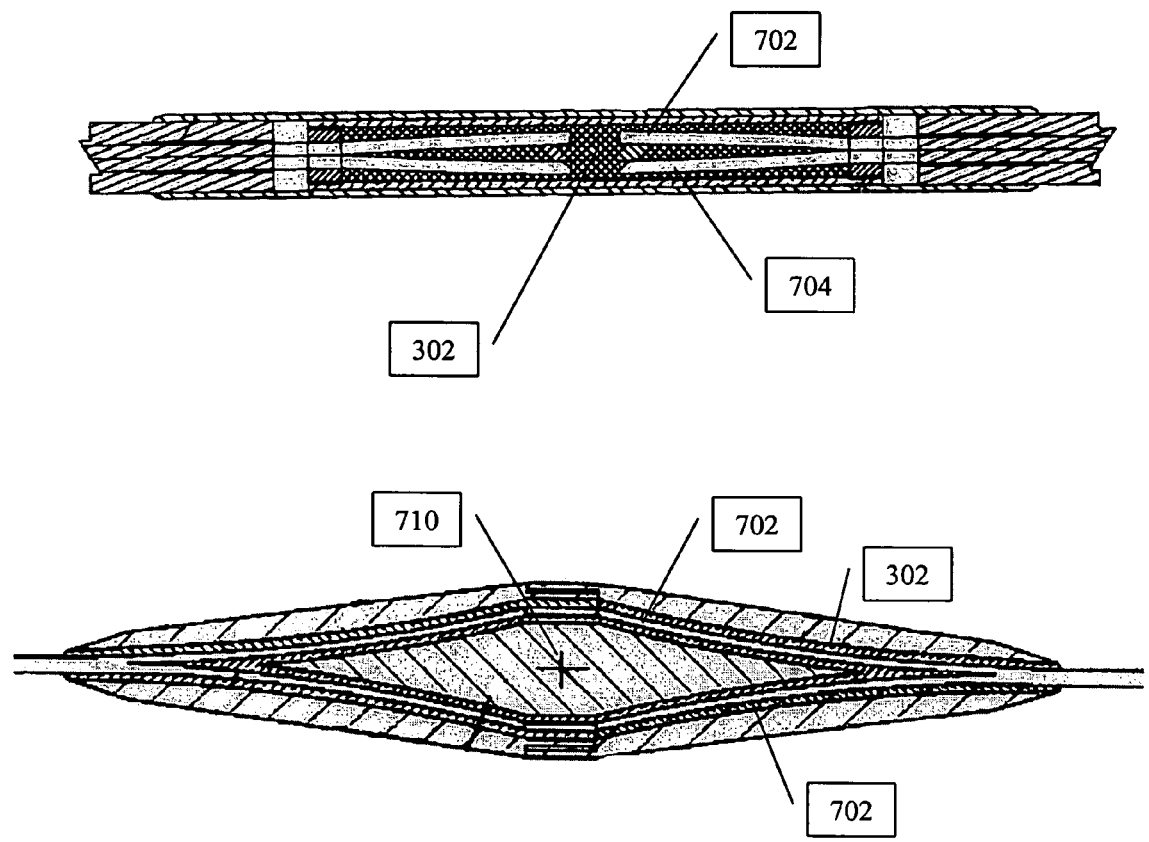
FIG. 11 shows several cross-sectional views of other embodiments of the splice for the ACCC cable in accordance with the present invention.

Other embodiments of the present invention can also splice the two or more ACCC reinforced cables. The present invention includes all splices that require physical manipulation or physical reconfiguration of the composite core. For instance, the core may be shaped, segmented, separated, roughened, or have its surface or geometry changed. Also, the invention includes any part that may be attached to the core to use in a mechanical coupling or other mechanical device. Some of these embodiments are shown in FIGS. 7 and 11. In one embodiment, the composite core 100 may be separated into segments 702. The segments 702 may be halves or quarter or some other fraction of the whole core 100. These segments 702 of the composite core 100 can be inserted into openings 704 that keep the core 100 separated in the elastomer 302. In this embodiment, the surface area contacted by the elastomer 302 increases, and therefore, the force holding the composite core 100 increases. In addition, splaying apart the composite core 100 can provide a mechanical hold also. To extract the composite core 100 from the splice, the segments 702 must be compressed back into the form of a rod. Thus, as the segments 702 are pushed together, the frictional forces on the segments 702 increase. This splice may then provide a system that adjusts the forces holding the composite core 100 as the tensional forces trying to extract the core 100 from the splice increase.

Figure 10:
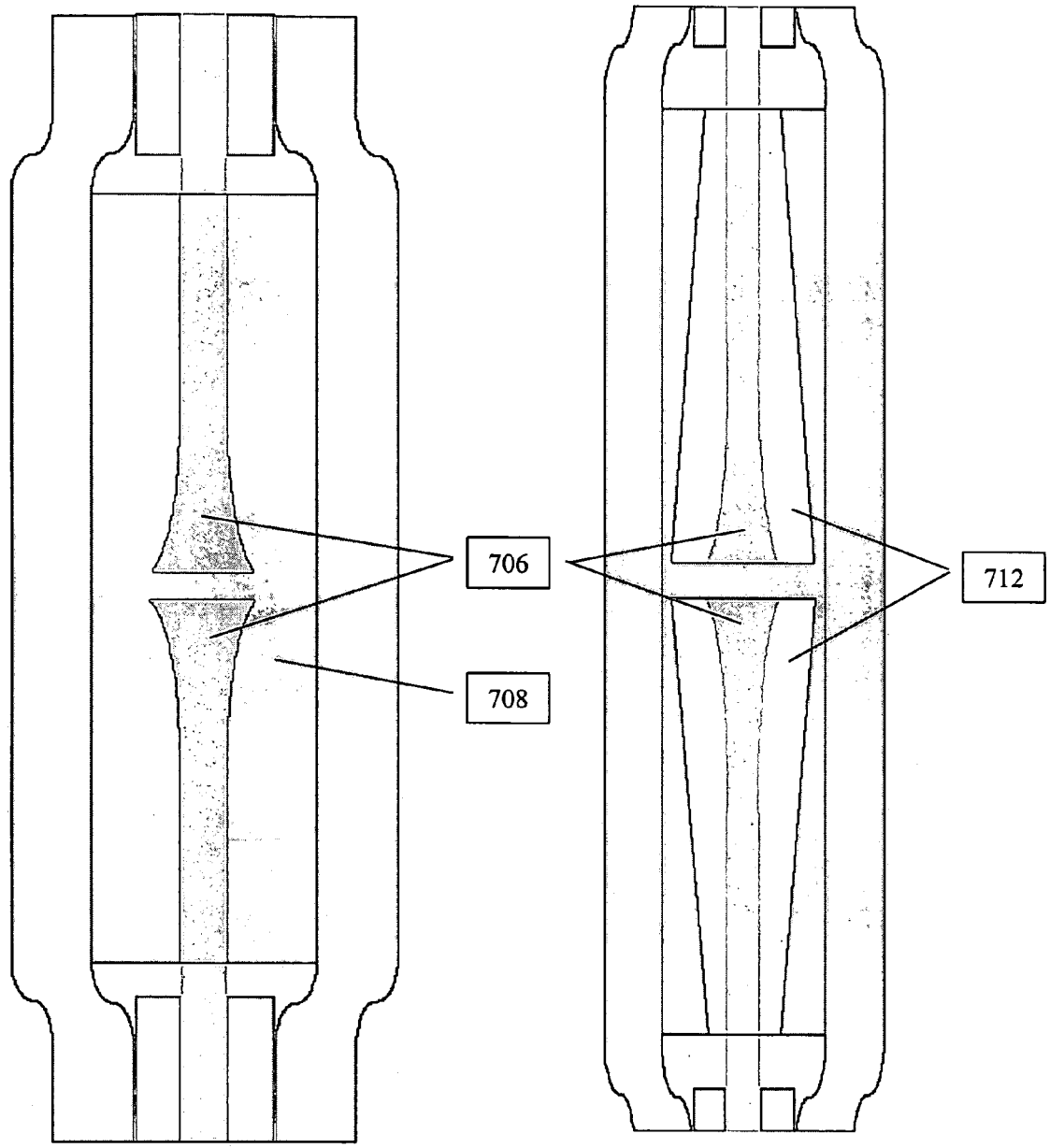
FIG. 10 shows several cross-sectional views of other embodiments of the splice for the cable in accordance with the present invention.

Numerous mechanical splices are also included in the present invention. A mechanical splice includes any system or apparatus to mechanically couple the ACCC cables that uses more than frictional force to hold the composite core. One such embodiment has been explained above. Segmenting the core and separating the segments can provide a type of mechanical hold. To further the mechanical hold explained previously, the segments may be glued or filled with epoxy to form a conical end piece 706. This end piece 706 is shown in FIGS. 7 and 10. It may be inserted into a funnel shaped elastomer 708 or rigid body. Now, to extract the composite core from the splice, the composite core must be physically crushed to remove the conical end 706 from the rigid enclosure 708. This mechanical hold increases the forces maintaining the splice as the tensional forces increase.

Another embodiment of these type of mechanical holds may forgo glueing the segments into a solid unit. Rather, a rigid insert 710 can be installed between the segments 702. For instance, in FIG. 11, a rigid piece 710 can be placed between the segments 702. As with the above embodiment, the forces on the segments 702 increase with tensional force because the rigid insert 710 cannot be compressed.

In another embodiment of the splice fitting 300, one or more notches 318 may be made in the composite core 100 before mating the core 100 with the elastomer 302. These notches 318 may be made by compressing the composite core 100 or carving out the notch 318 with a tool. Regardless, the notches 318 may be spaced at any distance and be placed at any point along the length of the exposed core 100. Once mated with the elastomer 302, the compressive forces on the elastomer 302 would cause the elastomer 302 to expand to fill the void created by the notches 318. Thus, the compression fitting 300 would create a mechanical hold along with the frictional hold produced by compressing the elastomer 302. This bond may be even stronger than mere frictional contact.

Another embodiment of the present invention includes splices where a part or member is attached to the composite core. Examples of these embodiments are shown in FIGS. 7 and 10. In these embodiments, a conical segment 712 is attached to the core. In one embodiment, the conical segment 712 has an elastomer lining in the interior of the lumen formed by the conical segments 712. The elastomer lining creates a frictional contact area with the composite core. These conical segments 712 with the core are inserted into the rigid body. Again, when the tension on the core increases, the conical segments 712 are compressed by the funnel shaped rigid body. The increased compressing is transferred to the composite core. Thus, the grip on the core is increased. The conical segments 712 may be any rigid material. Other attachments or linings will be recognized by one skilled in the art and are included in the present invention.

One skilled in the art will recognize other methods of manipulating the composite core to create other types of splices. The cables 200 and the compression fitting 300 completely mated form an electric cable splice. After the splice is made, the spluced cable 200 may be installed as if no splice were present.

A Method to Splice Together Two ACCC Cables

Figure 4:
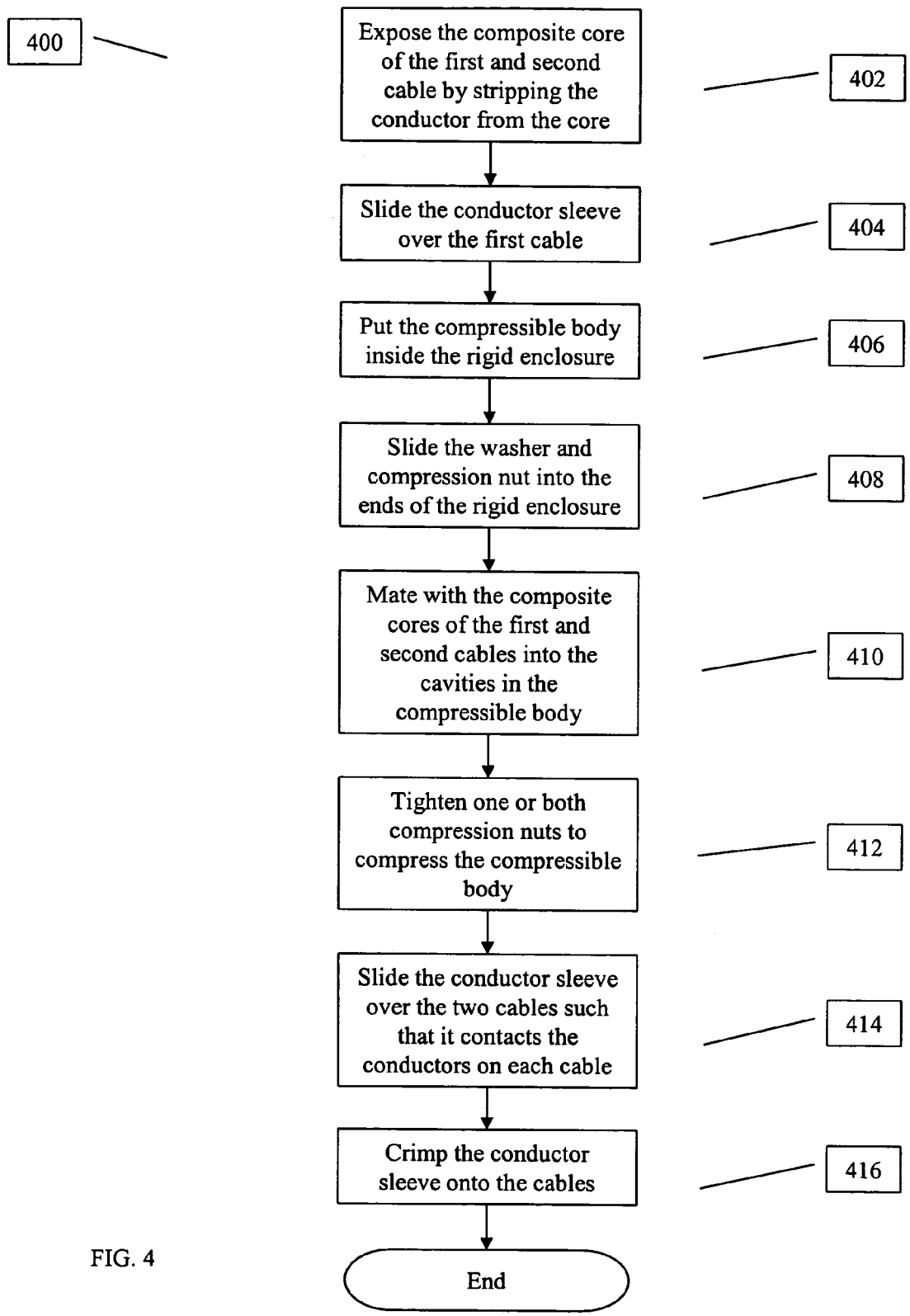
FIG. 4 is a flow diagram describing one embodiment of a method to splice together two ACCC cables in accordance with the present invention.

One embodiment of the method 400 to splice two ACCC cables 200 is shown in FIG. 4. First, the composite core 100 of the first cable 200 and second cable 200 can be exposed 402 by stripping away the conductors 202 encasing the composite cores 100. Stripping the conductors 202 may be done by a stripping tool. These tools and methods of stripping wire are well known in the art and will not be explained further.

After the composite core 100 is exposed, notches 318 may be made in the composite core 100. However, this step may be by-passed. The elastomer 302 may be inserted 406 into the splicing tube 304. The conductor sleeve 310 may also be slipped 404 over one of the cables 200. This step should be completed before the composite cores 100 are inserted into the elastomer 302. Once the cores 100 are inserted, the only method of putting on the conductor sleeve 310 would be to slip it over the entire length of one of the cables 200 until it reaches the splice. However, other embodiments of the splicing tube may be placed over the splice later in the process.

The composite cores 100, whether notched or not, can then be inserted 410 into the cavities 314 or cavity 314 of the elastomer 302. Inserting the composite cores 100 entails the slipping of the cores 100 into their respective cavity 314 until the core 100 reaches the terminus of the cavity 314 or until the core 100 reaches about the midpoint 324 of a single cavity 314. While the core 100 may be slipped less than or more than halfway, the strongest hold on both cables 200 occurs when each cable 200 is inserted to about the midpoint 324 of the elastomer 302.

To create the compression fit and frictional hold on the composite core 100, the elastomer 302 is compressed. The compression implement 306 is used to squeeze the elastomer 302. In one embodiment, a compression nut 306 is threaded 408 into the splicing tube 304 and then tightened 412, which presses on the elastomer 302. Threading the nut 306 into the splicing tube 310 can be done before mating the composite core 100 with the elastomer 302. The elastomer 302 in turn applies compressive forces on the composite core 100 of each cable 200. With the splicing tube 304 preventing the elastomer 302 from expanding, the elastomer 302 experiences compressive forces. In an exemplary embodiment, a washer 308 can be placed 408 into the splicing tube 304 before the compression nut 306 is threaded. As stated before, the washer 308 can prevent the nut 306 from binding the elastomer 302.

In one embodiment, the conductor sleeve 310 can be slipped 414 over the entire splice. The conductor sleeve 310 may be crimped 416 onto one or both of the cables 200. The crimping of the conductor sleeve 310 ensures that it will not migrate from its position over the splice. In other embodiments, the conductor sleeve 310 may be welded to one or both conductors 200 on the two cable 200s. In still another embodiment, the conductor sleeve 310 may be glued or adhesively attached to a cable 200. Once attached, the conductor sleeve 310 can carry electric current over the splice.

In an exemplary embodiment, a void 312 may be created between the conductor 200 of the cable and the compression nut 306. The void 312 is created when the nut 306 is tightened, and thus migrates further down the composite core 100 from the conductor 200 as the elastomer 302 is compressed. This void 312 can be problematic if it fills with water or a substance that can corrode the core 100, the conductor 200, or the nut 306. Thus, in one embodiment, these voids 312 are filled with a substance that prevents the penetration of water or other material into the void 312. The substance may be an inert material or some other gas, liquid or solid that can fill the void 312 and prevent any penetration into the void 312.

A exemplary composite core 100 with a diameter of 0.371 inches, may withstand compressive forces of about 10,000 psi. When the elastomer 302 is compressed by the compression nut 306, the compressive forces should be below the compression limit of the composite core 100. Thus, the elastomer 302 can be compressed to less than about 10,000 psi. In an exemplary embodiment, the elastomer 302 is compressed to 4,000 psi for a splice on an ACCC cable that replaces a Drake style ACSR conductor. These calculations are only exemplary but generally follow the calculations presented above.

An electrical cable must be able to maintain adequate tension. The tension in the line prevents sag. As a standard, tension in most Drake style ACSR cables is around 11,000 pounds. However, the present invention allows higher tension loads along the splice. The splice can handle tensions of around 33,000 pounds. Thus, the splice maintains a three (3) times safety factor.

Other configurations of the above elements is contemplated and included in the invention. In addition other elements may be added to the splice and are include in the invention.

Dead End Fittings

The present invention also relates to a dead end 100 used to terminate the ACCC reinforced cables 122 described herein. As explained, the main load bearing element of the ACCC cable 122 is the composite core 101. Therefore, it is advantageous to have a dead end 100 that can hold the composite core 101 of the ACCC cable 122. The dead ends are similar and function similarly to the splice fittings. One skilled in the art will recognize the similarities and how to modify a splice fitting to function as a dead end. Therefore, fewer examples of the dead end will be described. However, all variations of the splice fitting are also meant to apply to the dead end.

Figure 8A:
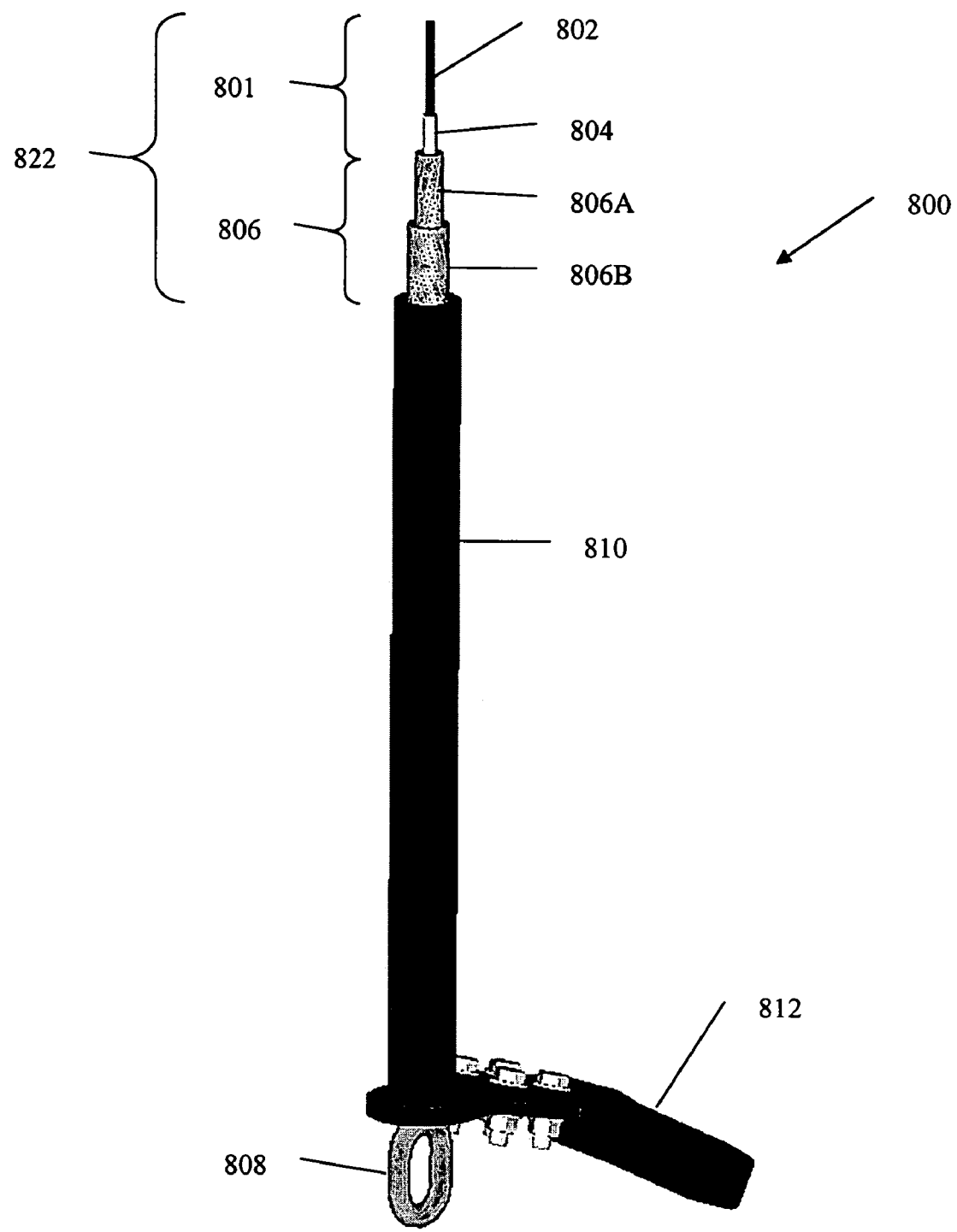
FIG. 8A shows one embodiment of a dead end in accordance with the present invention.
Figure 8B:
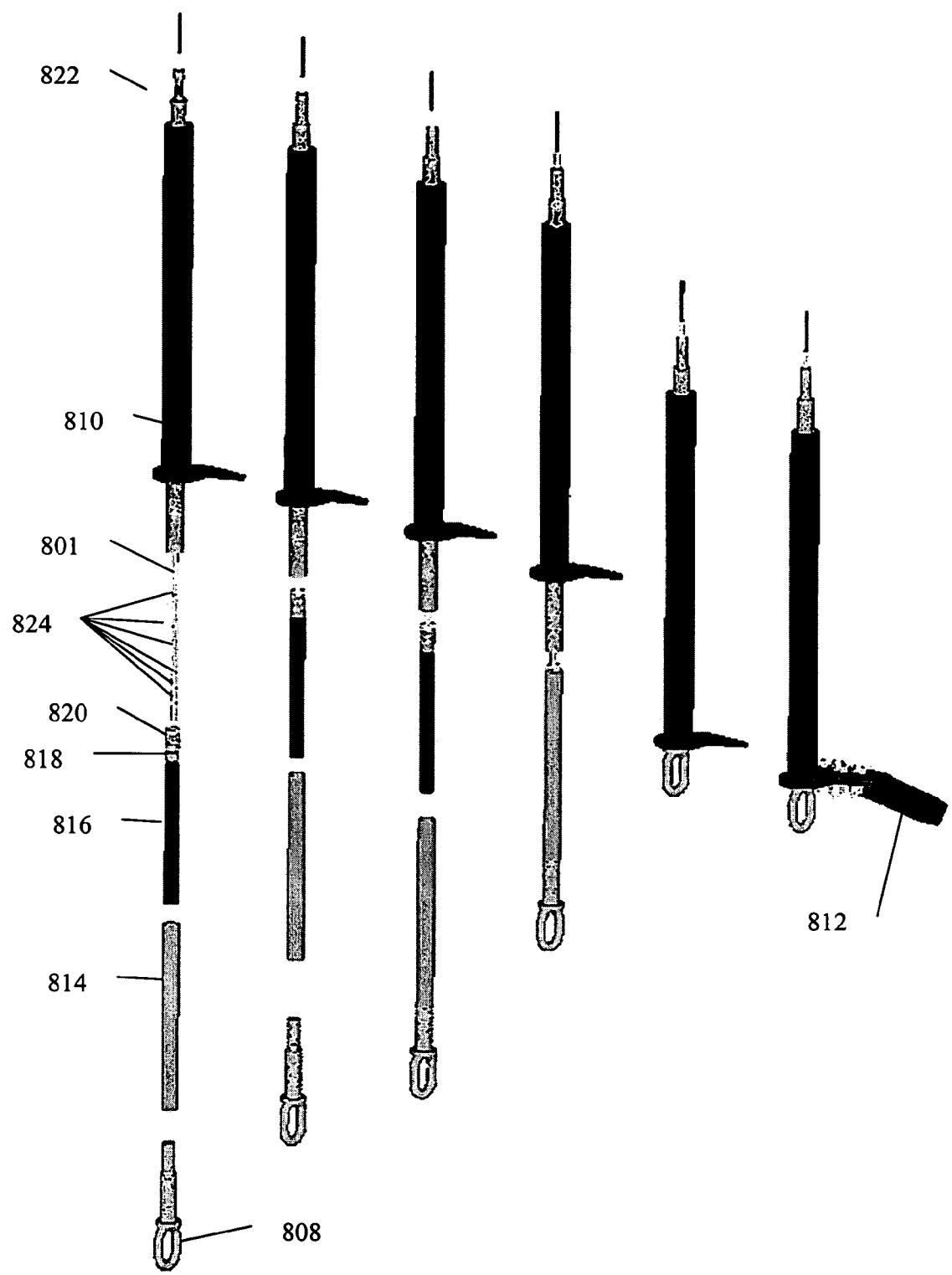
FIG. 8B is a series of drawings showing the different parts of an embodiment of the dead end and an assembly of these parts into a dead end in accordance with the present invention.
Figure 8C:
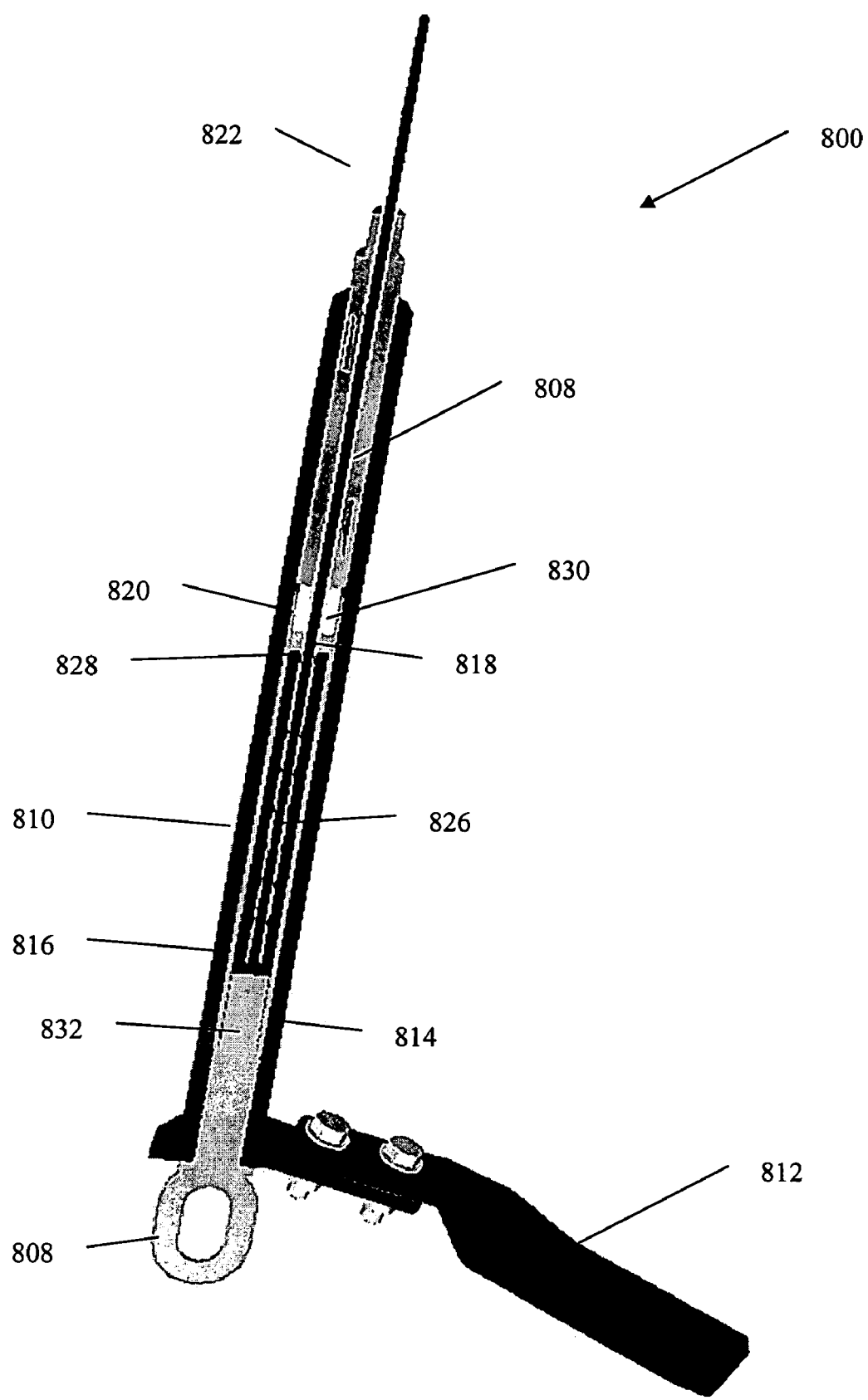
FIG. 8C shows a cross-sectional view of the one embodiment of the dead end in accordance with the present invention.

One embodiment of the compression fitting dead end 800 is shown in FIG. 8A through FIG. 8C. In this embodiment, the compression fitting dead end 800 may include, but is not limited to, a compressible body 816, a rigid enclosure 814, a connector 808, and at lease one compression implement 820. In further embodiments, the compression fitting dead end 800 may also include a washer 818 and a conductor sleeve 810. These elements of the compression fitting dead end 800 function to mate with the composite core 100 of the ACCC cable 200, compress the compressible body 816 such that friction holds onto the composite core 100, and anchor the dead end 800 to a structure. Each element will be explained further below.

The compressible body 816 is a structure that can be compressed under pressure. A compressible body 816 is any material that can be formed into an appropriate shape and be used to put compressive forces on the composite core 100. Examples of such materials may include, but are not limited to, malleable metals or polymers that can compress. One embodiment of the compressible body 816 would be an elastomer 816. The elastomer 816 may be a type such as CAMLAST from Cameron Elastomer Technology. Elastomers 816 can have the ability to withstand high temperatures that may be needed when the cable 200 is in operation. Throughout the remainder of this description, the compressible body 816 may be referred to as the elastomer 816. However, this description is not meant to limit the invention to that one embodiment, but all types of compressible bodies 816 that can perform the required function of frictionally holding the composite core 100 are included in this invention.

The elastomer 816 may provide one or more cavities 826 to mate with the composite core 100. These cavities 826 provide the female end of the mate with the composite core 100. In one embodiment, the cavity 826 perfectly fits the composite core 100. In essence, the inside shape and size of the cavity 826 is the same as the outside shape and size of the composite core 100. FIG. 8C shows the elastomer 816, its corresponding cavity 826, and the composite core 100 having a generally circular cross section. However, the composite core 100, the elastomer 816, and the cavity 826 may take on other shapes for cross sections as will be recognized by one skilled in the art. In the exemplary embodiment shown in FIG. 8C, the cavity 826 extends within the elastomer 816 and axially centered along the length of the elastomer 816. The composite core 100 can be inserted in the cavity 826 at the first end 828.

Another element of the compression fitting dead end 800 is the rigid enclosure 814. The rigid enclosure 814 provides a case that encapsulates the elastomer 816. The rigid enclosure 814 should have the same general shape as the elastomer 816 and allow the elastomer 816 to fit inside the rigid enclosure 814. In an exemplary embodiment, the rigid enclosure 814 is a tube 814 as shown in FIG. 8B. However, the invention is not limited to that one embodiment but may assume any shape that can encapsulate the elastomer 816. The rigid enclosure 814 prevents the elastomer 816 from expanding or becoming misshapen when the elastomer 816 is compressed. Thus, the rigid enclosure 814 must maintain its shape when the elastomer 816 is being compressed and pressing on the interior walls of the enclosure 814.

The rigid enclosure 814 may be made of various materials. The materials may include, but are not limited to, composites, graphite, hardened metals, or other sufficiently rigid and strong materials. In an exemplary embodiment, the rigid enclosure 814 is formed from steel.

In FIG. 8C, the rigid enclosure 814 has the shape of a tube 814. This shape is only exemplary. The rigid enclosure 814 should take on the shape of the elastomer 816. However, the rigid enclosure 814 may be hereinafter described as a tube 814. The rigid enclosure 814 provides openings to allow the elastomer 816 to mate with the composite core 100. The embodiment shown has a first open end 830 and a second open end 832. In addition, the rigid enclosure 814 also can provide additional openings for the compression implement 820.

The compression implement 820 is the device or means of compressing the elastomer 816. Thus, the compression implement 820 is any mechanical, electrical, pneumatic, or other device that can compress the elastomer 816. In an exemplary embodiment, the compression implement 820 is a compression nut 820 that screws into threads on the inside of the rigid enclosure 814. However, in other embodiment the compression implement 820 may use other devices and openings to compress the elastomer 816. Hereinafter, the compression implement 820 will be described as a compression nut 820, but the invention is not meant to be limited to that one embodiment.

The compression nut 820 can have a hollow center. This hollow center can allow the composite core 100 to pass through the compression nut 820 and into the elastomer 816. While this is only an exemplary embodiment, this arrangement of the compression nut 820, elastomer 816, composite core 100, and rigid enclosure 814 allows there to be only two openings 832 and 830 in the rigid enclosure 814. The compression nut 820 can have a series of threads along the outside surface of the nut 820. These threads can attach the nut 820 to the tube 814, which has related threads along the inside surface of the tube 814. By tightening the compression nut 820, a compressive force is applied to the elastomer 816. This compressive force causes a compressive and frictional area of contact between the elastomer 816 and the composite core 100. The frictional contact extends along the length of the composite core 100 that is inside the elastomer 816. It is the compressive and frictional forces that hold the composite core 100 in the elastomer 816.

Another component of the compression fitting dead end 800 may be a connector 808. The connector 808 may be any mechanical device that anchors the dead end 800 and the cable 200 to a structure. In the embodiment shown, the connector 808 is an eye bolt or clevis. In other embodiments, the connector 808 may be a hook that can be set in a hole, a plate that can be screwed to a set of bolts, or a bolt that can screw to a female mate. One skilled in the art will recognize the various types of connectors 808 that may be used. All of the connectors 808 are incorporated into this invention. Hereinafter, the connector 808 will be described as an eye bolt 808, but that description is not meant to limit the invention to that one embodiment.

The eye bolt 808 may be attached to the rigid enclosure 814. By screwing into a second set of threads at the second open end 832, the eye bolt 808 may be incorporated into the mechanical couple with the cable 200. Thus, when the eye bolt 808 is anchored to a structure, the components that hold the cable 200 are also anchored. The eye bolt 808 can be anchored to any type of structure. The structure may include, but is not limited to, a pole, a building, a tower, or a substation.

Another possible component of the compression fitting dead end 800 is a washer 818. The washer 818 can be placed in the opening of the tube 814 before threading the compression nut 820 into the tube 814. The washer 818 provides a surface for the nut 820 to turn on that prevents the turning nut 820 from grabbing the elastomer 816 and causing the elastomer 816 to twist. This twisting or binding could damage the elastomer 816 or prevent the even and uniform compression of the elastomer 816. Thus, the washer 818 acts as a preventative measure against binding.

In another embodiment, the compression fitting dead end 800 may also include a conductor sleeve 810. The conductor sleeve 810 refers to any mechanical structure that functions either in whole or in part as an electrical jumper between the first cable 200 and the end user. A conductor sleeve 810 conducts and passes the electric current from the cable 200 over the dead end 800 and to the end user. In one embodiment, the conductor sleeve 810 may be a cable 200 that is crimped to the conductor 806 of the cable 200 and strung to the end user. In an exemplary embodiment, the conductor sleeve 810 is a hollow cylinder that can be slipped over the dead end 800, contact the conductor 806 on the cable 200, and contact the end user. The conductor sleeve 810 may be an electrically conductive tube that can carry the electric current. This embodiment of the conductor sleeve 810 is shown in FIG. 8A and is only exemplary.

A conductor sleeve 810 may also have a second component. In the embodiment shown in FIG. 8A, the conductor sleeve has a tube 810 and a jumper terminal 812. The tube 810 can carry the electrical current over the dead end 800. The jumper terminal 812 can provide an electrical connector with the end user. This embodiment is only exemplary. Other embodiments are possible and are incorporated into this invention.

The conductor sleeve 810 and the electrical jumper 812 may have various cross-sectional areas. In one embodiment, the cross-sectional area of the conductor sleeve 810 exceeds the cross-sectional area of the conductor 806 on the cable 200. For instance, the cross-sectional area of the conductor sleeve 810 may be twice the cross-sectional area of the cable conductors 806. By increasing the cross-sectional area in the conductor sleeve 810, the operating temperature of the conductor sleeve 810 can be kept lower than the cable conductors 806. This lower temperature protects the elastomer 816 and other compression fitting dead end parts from damage due to high operating temperatures.

In another embodiment of the compression fitting dead end 800, one or more notches 824 may be made in the composite core 100 before mating the core 100 with the elastomer 816. These notches 824 may be made by compressing the composite core 100 or carving out the notch 824 with a tool. Regardless, the notches 824 may be spaced at any distance and be placed at any point along the length of the exposed core 100. Once mated with the elastomer 816, the compressive forces on the elastomer 816 would cause the elastomer 816 to expand to fill the void created by the notches 824. Thus, the compression fitting dead end 800 would create a mechanical hold along with the frictional hold produced by compressing the elastomer 816. This bond may be even stronger than mere frictional contact.

The cables 200 and the compression fitting dead end 800 completely mated form a cable terminal. After the cable terminal is made, the cable terminal may be installed, and the electrical circuit connected to the end user.

A Method to Terminate An ACCC Cable

Figure 9:
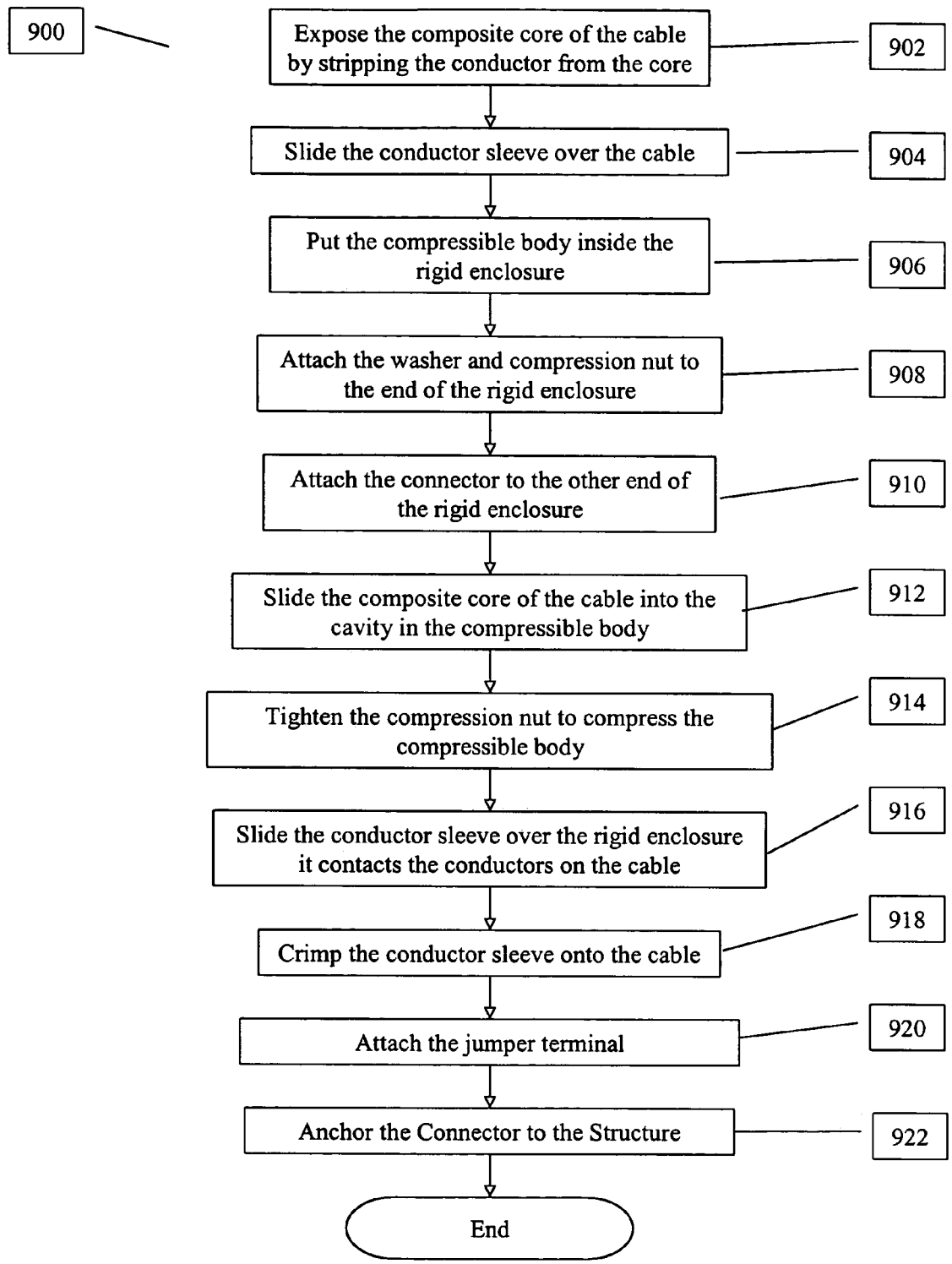
FIG. 9 is a flow diagram describing one embodiment of a method to terminate the cable in accordance with the present invention.

One embodiment of the method 900 to terminate an ACCC cable 200 is shown in FIG. 9. First, the composite core 100 of the cable 200 can be exposed 902 by stripping away the conductor 806 encasing the composite core 100. Stripping the conductor 806 may be done by a stripping tool. These tools and methods of stripping wire are well known in the art and will not be explained further.

After the composite core 100 is exposed, notches 824 may be made in the composite core 100. However, this step may be by-passed. The elastomer 816 may be inserted 906 into the tube 814. The conductor sleeve 810 may also be slipped 904 over the cable 200. This step should be completed before the composite core 100 is inserted into the elastomer 816. Once the core 100 is inserted, there will be no method of putting the conductor sleeve 810 over the dead end 800. However, other embodiments of the conductor sleeve may be placed over the dead end later in the process.

In one embodiment, the washer 818 and compression nut 820 may be placed 908 in the first opening 830 of the rigid body 814. In addition, the connector 808 may be attached 910 to the second end 832 of the rigid body 814. These two connections can be made by screwing the connector 808 and the compression nut 820 into the ends 830 and 832 of the rigid body 814. At this point, the rigid body 814 is prepared to receive the composite core 100. The composite core 100, whether notched or not, can be inserted 912 into the cavity 826 of the elastomer 816. Inserting the composite core 100 entails the slipping of the core 100 into the cavity 826, possibly until the core 100 reaches the terminus of the cavity 826.

To create the compression fit and frictional hold on the composite core 100, the elastomer 816 is compressed. The compression implement 820 is used to squeeze the elastomer 816. In one embodiment, a compression nut 820 is threaded 908 into the tube 814 and then tightened 914, which presses on the elastomer 816. The elastomer 816 in turn applies compressive forces on the composite core 100 of the cable 200. With the tube 814 preventing the elastomer 816 from expanding, the elastomer 816 experiences compressive forces.

In one embodiment, the conductor sleeve 810 can be slipped 916 over the dead end. The conductor sleeve 810 may be crimped 916 onto the cable 200. The crimping of the conductor sleeve 810 ensures that it will not migrate from its position over the dead end 800. In other embodiments, the conductor sleeve 810 may be welded to the conductor 806. In still another embodiment, the conductor sleeve 810 may be glued or adhesively attached to the cable 200. Once attached, the conductor sleeve 810 can carry electric current over the dead end.

In an exemplary embodiment, a jumper terminal 812 may be attached to the conductor sleeve 810. In one embodiment, the jumper terminal 812 is bolted to the conductor sleeve 810. The jumper terminal 812 may also be welded or adhesively attache to the conductor sleeve 810. One skilled in the art will recognize other methods of attaching the conductor sleeve 810 to the jumper terminal 812. The jumper terminal 812 provides the means of connection between the conductor sleeve 810 and the end user.

The dead end 800, after the connector 808 and the core 100 are attached, can be anchored 422 to a structure. Anchoring the dead end 800 may include slipping the eye of the eye bolt 808 or clevis over some hook. The structure may be a pole or a building. In one embodiment, the eye is slipped onto a hook; the jumper terminal 812 is connected to a wire that feeds the electrical current into a nearby building. One skilled in the art will recognize other structures to anchor to and other methods of completing such attachments.

We claim:

1. A compression fitting to connect a first aluminum conductor composite core reinforced cable and a second aluminum conductor composite core reinforced cable, each cable having a composite core surrounded by a conductor, comprising:
   a. a compressible body having at least one cavity to mate with the composite core from the first cable and the composite core from the second cable;
   b. a rigid enclosure, wherein the rigid enclosure encapsulates the compressible body to prevent the compressible body from expanding when compressed, and wherein the rigid enclosure has at least one opening to expose the at least one cavity to enable the compressible body to mate with the composite core;

c. at least one compression implement that fits into the at least one opening, wherein the compression implement compresses the compressible body, and wherein compressing the compressible body holds the composite core of the first cable and the second cable with frictional forces; and d. a conductor enclosure that slips over the rigid enclosure and connects the conductor of the first cable with the conductor of the second cable to enable conduction of electricity between the first and second cables.

2. A compression fitting according to claim 1, wherein the compressible body is an elongated cylindrical body having a first end and a second end, wherein a first cavity creates an opening in the first end and axially extends along the length of and within the compressible body almost to a midpoint of the compressible body, and wherein a second cavity creates an opening in the second end and axially extends along the length of and within the compressible body almost to the midpoint of the compressible body.

3. A compression fitting according to claim 2, wherein the first cavity mates with the composite core of the first cable and the second cavity mates with the composite core of the second cable.

4. A compression fitting according to claim 1 wherein the compressible body is an elongated cylindrical body having a first end and a second end, wherein the cavity creates and opening in the first end and the second end and axially extends the entire length of along and within the compressible body.

5. A compression fitting according to claim 4, wherein the composite core of the first cable is inserted into the cavity at the first end and the composite core of the second cable is inserted into the cavity at the second end.

6. A compression fitting according to claim 1, wherein the compressible body is an elastomer.

7. A compression fitting according to claim 1, wherein the rigid enclosure is a tube with a first open end and a second open end that accepts the compressible body.

8. A compression fitting according to claim 7, wherein the first open end allows the composite core of the first cable to mate with the compressible body and the second open end allows the composite core of the second cable to mate with the compressible body.

9. A compression fitting to connect a first aluminum conductor composite core reinforced cable and a second aluminum conductor composite core reinforced cable, each cable having a composite core surrounded by a conductor, comprising:

a. a compressible body comprising an elastomer, the compressible body further comprising an elongated cylindrical body having a first end and a second end, wherein a first cavity creates an opening in the first end and axially extends along the length of and within the compressible body almost to a midpoint of the compressible body, and wherein a second cavity creates an opening in the second end and axially extends along the length of and within the compressible body almost to the midpoint of the compressible body;

b. a rigid enclosure comprising a tube having a first open end and a second open end to accent the compressible body and the composite core, wherein the rigid enclosure encapsulates the compressible body to prevent the compressible body from expanding when compressed;

c. a first compression implement that fits over the composite core of the first cable and into the first open end the rigid enclosure and a second compression implement that fits over the composite core of the second cable and into the second open end of the rigid enclosure, wherein at least one of the first compression implement or the second compression implement compresses the compressible body to at least about 4,000 psi, and wherein compressing the compressible body holds the composite core of the first cable and the second cable with frictional forces; and d. a conductor enclosure that slips over the rigid enclosure and connects the conductor of the first cable with the conductor of the second cable to enable conduction of electricity between the first and the second cables.

10. A compression fitting according to claim 9, wherein the rigid enclosure is a steel tube.

11. A compression fitting according to claim 9, wherein at least one compression implement is a compression nut that threads into one of the first or the second open end of the rigid enclosure, and wherein tightening the compression nut compresses the compressible body.

12. A compression fifing according to claim 11, further comprising a washer placed between the compression nut and the compressible body in one of the first or the second open end of the rigid enclosure to prevent binding in the compressible body when the compression nut is turned.

13. A compression fitting according to claim 9, wherein the conductor enclosure has a greater cross sectional area than the conductor to lower operating temperatures across the splice.

14. A compression fitting according to claim 9, wherein the composite core has one or more notches along the length of core mated with the compressible body, and wherein the compressible body expands into the notch when compressed.

15. A method to splice together a first aluminum conductor composite core reinforced cable and a second aluminum conductor composite core reinforced cable, each cable having a composite core surrounded by a conductor, comprising:

a. exposing a composite core of a first cable;
b. exposing a composite care of a second cable;
c. inserting the composite core of the first cable into a compressible body;
d. inserting the composite core of the second cable into the compressible body;
e. inserting the compressible body into a rigid enclosure;
f. applying a compressive force of at least about 4,000 psi to the compressible body to hold frictionally the composite core of the first cable and the second cable forming a splice; and
g. slipping a conductor sleeve over the splice to conduct electricity between the first cable and the second cable.

16. A method to splice according to claim 15, wherein compressing the compressible body includes:

a. threading a compression nut into the rigid enclosure; and
b. tightening the compression nut to compress the compressible body.

17. A method to splice according to claim 16, wherein threading the compression nut includes placing a washer between the compressible body and the compression nut to prevent the compressible body from binding during tightening of the compression nut.

18. A method to splice according to claim 15, wherein the conductor sleeve is crimped to one of the first cable, the second cable, or both the first cable and the second cable to keep the conductor sleeve in place over the splice.

19. A method to splice according to claim 15, wherein a void is created between the conductor and the compressible body when the compressible body is compressed.

20. A method to splice according to claim 19, wherein the void is filled with a substance to prevent moisture penetration into the void.

21. A method to splice according to claim 15, wherein a compressive force of less than 10,000 psi is placed on the core.

22. A method to splice according to claim 15, wherein the splice can maintain a tension in the cable of greater than 11,000 pounds.

23. A method to splice according to claim 15, wherein the splice can maintain a tension in the cable of about 33,000 pounds.

24. An electrical cable splice, comprising:
   a. a first aluminum conductor composite core reinforced cable;
   b. a second aluminum conductor composite core reinforced cable;
   c. a splice, comprising:
      i. a compressible body having at least one cavity to mate with the composite core from the first cable and the composite core from the second cable;
      ii. a rigid enclosure, wherein the rigid enclosure envelops the compressible body to prevent the compressible body from expanding when compressed, and wherein the rigid enclosure has at least one opening to expose the at least one cavity to enable the compressible body to mate with the composite core;
      iii. at least one compression implement that fits into the at least one opening, wherein the compression implement compresses the compressible body, and wherein compressing the compressible body holds the composite core of the first cable and the second cable with frictional forces; and
      iv. a conductor enclosure tat slips over the rigid enclosure and connects the conductor of the first cable with the conductor of the second cable to conduct electricity between the first and the second cables;
   wherein, a compressive force of at least about 4,000 psi is applied to the compressible body.

25. An electrical cable splice according to claim 24, wherein the compressible body is an elongated cylindrical body having a first end and a second end, wherein a first cavity creates an opening in the first end and axially extends along the length of and within the compressible body almost to a midpoint of the compressible body, and wherein a second cavity creates an opening in the second end and axially extends along the length of and within the compressible body almost to the midpoint of the compressible body.

26. An electrical cable splice according to claim 25, wherein the first cavity mates with the composite core of the first cable and the second cavity mates with the composite core of the second cable.

27. An electrical cable splice according to claim 24, wherein the compressible body is an elongated cylindrical body baying a first end and a second end, and wherein the cavity creates an opening in the first end and the second end and axially extends the entire length of along and within the compressible body.

28. An electrical cable splice according to claim 37, wherein the composite core of the first cable is inserted into the cavity at tube first end and the composite core of the second cable is inserted into the cavity at the second end.

29. An electrical cable splice according to claim 24, wherein the compressible body is an elastomer.

30. An electrical cable splice according to claim 24, wherein the rigid enclosure is a tube with a first open end and a second open end that accepts the compressible body.

31. An electrical cable splice according to claim 30, wherein the first open end allows the composite core of the first cable to mate with the compressible body and the second open end allows the composite core of the second cable to mate with the compressible body.

32. An electrical cable splice, comprising:
   a. a first aluminum conductor composite core reinforced cable;
   b. a second aluminum conductor composite core reinforced cable:
   c. a splice, comprising:
      i. a compressible body comprising an elastomer having at least one cavity to mate with the composite core from the first cable and the composite core from the second cable;
      ii. a rigid enclosure, wherein the rigid enclosure envelops the compressible body to prevent the compressible body from expanding when compressed, and wherein the rigid enclosure comprises a tube having at least a first opening and a second opening to expose the at least one cavity to enable the compressible body to mate with the composite core; and
      iii. a first compression implement that fits over the composite core of the first cable and into the first opening of the rigid enclosure and a second compression implement that fits over the composite core of the second cable and into the second opening of the rigid enclosure, and wherein at least one of the first compression implement or the second compression implement compresses the compressible body; and
      iv. a conductor enclosure that slips over the rigid enclosure and connects the conductor of the first cable with the conductor of the second cable to conduct electricity between the first and the second cables;
   wherein, a compressive force of at least about 4,000 psi is applied to the compressible body, and wherein, the splice can maintain a tensional force of at least about 11,000 pounds up to about 33,000 pounds.

33. An electrical cable splice according to claim 32, wherein the rigid enclosure is a steel tube.

34. An electrical cable splice according to claim 32, wherein at least one compression implement is a compression nut that threads into at least one of the openings of the rigid enclosure, and wherein tightening the compression nut compresses the compressible body.

35. An electrical cable splice according to claim 34, further comprising a washer placed between the compression nut and the compressible body in the at least one opening to prevent binding in the compressible body when the compression nut is turned.

36. An electrical cable splice according to claim 32, wherein the composite core has one or more notches along the length of core mated with the compressible body, and wherein the compressible body expands into the notch when compressed.

37. A compression fifing dead end to terminate an aluminum conductor composite core reinforced cable, the cable having a composite core surrounded by a conductor, comprising:

a. a compressible body a comprised of an elastomer, the compressible body further comprising an elongated cylindrical body having a first end, wherein a first cavity creates an opening in the first end and axially extends along the length of and within the compressible body almost to an endpoint of the compressible body, and wherein the first cavity mates with the composite core of the cable;

b. a rigid enclosure comprising a tube with a first open end and a second open end that accents the compressible body, wherein the rigid enclosure encapsulates the compressible body to prevent the compressible body from expanding when compressed;

c. a connector, that attaches to the rigid enclosure at the at least one opening and connects to a structure that holds the dead end; and d. a compression implement that fits into the at least one opening, and compresses the compressible body, wherein compressing the compressible body holds the composite core of the cable with frictional forces; and e. a conductor enclosure tat slips over the rigid enclosure.

38. A method to terminate an aluminum conductor composite core reinforced cable, the cable having a composite core surrounded by a conductor, comprising:

a. exposing a composite core of the cable;

b. inserting the composite core of the cable into a compressible body;

c. inserting the compressible body into a rigid enclosure d. compressing the compressible body to hold frictionally the composite core of the cable, wherein compressing the compressible body includes:

threading a compression nut into the rigid enclosure; and tightening the compression nut to compress the compressible body;

d. coupling a connector to the compressible body; and e. attaching the connector to a structure to physically terminate the dead end;

wherein, the aluminum conductor composite core comprises a plurality of fibers embedded in a resin matrix.

39. A method to terminate according to claim 38, wherein threading the compression nut includes placing a washer between the compressible body and the compression nut to prevent the compressible body from binding during tightening of the compression nut.

40. A cable terminal, comprising:

a. an aluminum conductor composite core reinforced cable;

b. a compression fitting dead end, comprising:

i. a compressible body comprising an elastomer having a cavity to mate with a composite core from the cable;

ii. a rigid enclosure, wherein the rigid enclosure encapsulates the compressible body to prevent the compressible body from expanding when compressed, and wherein the rigid enclosure has at least one opening to expose the cavity to enable the compressible body to mate with the composite core;

iii. a connector, wherein the connector attaches to the rigid enclosure at the at least one opening and connects to a structure that holds the dead end; and iv. a compression implement that fits into the at least one opening, wherein the compression implement compresses the compressible body, and wherein compressing the compressible body holds the composite core of the cable with frictional forces.

* * * * *

UNITED STATES PATENT AND TRADEMARK OFFICE
CERTIFICATE OF CORRECTION

PATENT NO. : 7,041,909 B2  Page 1 of 1
APPLICATION NO. : 10/690839
DATED : May 09, 2006
INVENTOR(S) : Clement Hiel and George Korzeniowski It is certified that error appears in the above-identified patent and that said Letters Patent is hereby corrected as shown below:

Title Page, item [75] inventors should read --
George Korzeniowski
David C. Bryant --

Signed and Sealed this

Fourteenth Day of November, 2006

JON W. DUDAS
*Director of the United States Patent and Trademark Office*